US012572363B2

(12) United States Patent
Blagodurov et al.

(10) Patent No.: US 12,572,363 B2
(45) Date of Patent: Mar. 10, 2026

(54) IOMMU COLLOCATED RESOURCE MANAGER

(71) Applicant: Advanced Micro Devices, Inc., Santa Clara, CA (US)

(72) Inventors: Sergey Blagodurov, Boxborough, MA (US); Masab Ahmad, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 159 days.

(21) Appl. No.: 17/565,336

(22) Filed: Dec. 29, 2021

(65) Prior Publication Data

US 2023/0205539 A1    Jun. 29, 2023

(51) Int. Cl.
G06F 9/38 (2018.01)
G06F 1/26 (2006.01)
G06F 1/3225 (2019.01)
G06N 3/04 (2023.01)

(52) U.S. Cl.
CPC .............. G06F 9/3842 (2013.01); G06F 1/26 (2013.01); G06F 1/3225 (2013.01); G06N 3/04 (2013.01); Y02D 10/00 (2018.01)

(58) Field of Classification Search
None
See application file for complete search history.

(56) References Cited

U.S. PATENT DOCUMENTS

| | | | | |
|---|---|---|---|---|
| 5,765,213 A * | 6/1998 | Ofer | .................... | G06F 12/0862 |
| | | | | 711/213 |
| 9,304,811 B2 * | 4/2016 | Yao | ........................ | G06F 9/5038 |

| | | | | |
|---|---|---|---|---|
| 9,594,521 B2 | 3/2017 | Blagodurov et al. | | |
| 10,303,472 B2 * | 5/2019 | Lowell | .................. | G06F 9/3824 |
| 11,182,306 B2 * | 11/2021 | Moyer | ............... | G06F 12/0888 |
| 11,263,529 B2 * | 3/2022 | Yoon | ....................... | G06N 3/084 |
| 11,550,723 B2 * | 1/2023 | Choudhary | ......... | G06F 12/0811 |
| 2006/0227880 A1 | 10/2006 | Gordon et al. | | |
| 2013/0232320 A1 * | 9/2013 | Dale | ....................... | G06F 9/383 |
| | | | | 712/27 |
| 2014/0075164 A1 * | 3/2014 | Indukuru | ............ | G06F 11/3419 |
| | | | | 712/E9.016 |
| 2014/0143781 A1 * | 5/2014 | Yao | ....................... | G06F 9/5016 |
| | | | | 718/100 |
| 2017/0017674 A1 | 1/2017 | Scheuer et al. | | |

(Continued)

OTHER PUBLICATIONS

Machine Translation of Chinese Patent Application CN 107908477 A, 2017. (Year: 2017).*

(Continued)

*Primary Examiner* — Steven G Snyder
(74) *Attorney, Agent, or Firm* — Volpe Koenig

(57) ABSTRACT

Devices, methods and systems for managing resources in a computing device. Information regarding resource usage is captured. A prediction is generated, based on the information, that resource usage by a processor will exceed a threshold during an upcoming time. An operating parameter of the processor is adjusted, based on the prediction. In some implementations, information regarding memory bandwidth is captured. A prediction is generated, based on the information, that a memory region stored in a first memory device will be addressed by a memory intensive instruction during an upcoming time period. Data stored in the memory region is moved to a second memory device, based on the prediction.

14 Claims, 8 Drawing Sheets

(56) References Cited

U.S. PATENT DOCUMENTS

| | | | | |
|---|---|---|---|---|
| 2017/0147233 A1* | 5/2017 | De | | G06F 3/061 |
| 2017/0147493 A1* | 5/2017 | Eickemeyer | | G06F 12/0862 |
| 2018/0024867 A1 | 1/2018 | Gilsdorf et al. | | |
| 2018/0143829 A1* | 5/2018 | Lowell | | G06F 9/3851 |
| 2018/0143911 A1* | 5/2018 | Moyer | | G06F 12/0888 |
| 2019/0034093 A1* | 1/2019 | Jin | | G06F 13/1663 |
| 2019/0101974 A1 | 4/2019 | Guim | | |
| 2019/0102310 A1 | 4/2019 | Ramrakhyani et al. | | |
| 2019/0370176 A1* | 12/2019 | Priyadarshi | | G06F 12/0893 |
| 2020/0065247 A1* | 2/2020 | Choudhary | | G06F 12/0862 |
| 2020/0110705 A1* | 4/2020 | Jo | | G06F 9/30101 |
| 2020/0193268 A1 | 6/2020 | Blagodurov et al. | | |
| 2021/0081016 A1 | 3/2021 | Park et al. | | |
| 2021/0089414 A1* | 3/2021 | Park | | G06F 11/302 |
| 2021/0117334 A1 | 4/2021 | Guim Bernat et al. | | |
| 2022/0100567 A1* | 3/2022 | Krishnan | | G06T 1/60 |
| 2023/0176979 A1* | 6/2023 | Shulyak | | G06F 12/1036 |
| | | | | 711/205 |
| 2025/0138878 A1* | 5/2025 | Mcgavock | | G06F 9/5027 |

OTHER PUBLICATIONS

Machine Translation of Japanese Patent Application JP 2013502645 A, 2013. (Year: 2013).*

'MemMAP: Compact and Generalizable Meta-LSTM Models for Memory Access Prediction' by Ajitesh Srivastava et al., 2020. (Year: 2020).*

Machine Translation of Chinese Patent Application CN 109597771 A to Ramrakhyani et al, 2019. (Year: 2019).*

International Search Report and Written Opinion for International Application No. PCT/US2022/050488 dated Mar. 22, 2023, pp. 1-10.

Chang et al., "To move or not to move? page migration for irregular applications in over-subscribed GPU memory systems with DynaMap,", Proceedings of the 4th International Workshop On Practical Reproducible Evaluation of Computer Systems, ACMPUB27, New York, Juen 14, 2021, pp. 1-12.

Adavally et al., "Dynamically Adapting Page Migration Policies Based on Applications' Memory Access Behaviors", ACM Journal On Emerging Technologies in Computing Systems (JETC), vol. 17, No. 2, Mar. 24, 2021.

Guo et al., "On-demand resource provision based on load estimation and service expenditure in edge cloud environment", Journal of Network and Computer Applications, vol. 151, Dec. 9, 2019.

Extended European Search Report for corresponding European Application No. 22917157 dated Oct. 24, 2025, 17 pages.

* cited by examiner

IOMMU COLLOCATED RESOURCE MANAGER

BACKGROUND

Modern computing systems typically include more than one type of processor. For example, it is common for personal computers to include both a CPU and a GPU. Such systems also typically include more than one kind of memory. For example, a personal computer may include a main memory and may also include graphics memory. The main memory of a personal computer is typically made up of dynamic random-access memory (DRAM), which provides a relatively high capacity, and relatively lower bandwidth, and the graphics memory is typically made up of a high bandwidth memory (HBM), with a relatively lower capacity.

It is typical for the CPU to perform computations on data stored in the main memory, and for the GPU to perform computations on data stored in the graphics memory. In most cases however, the CPU can also access the graphics memory. Further, it is becoming more common for memory bus speeds to be such that the CPU is able to take advantage of the higher memory bandwidth of the graphics memory without losing an unacceptable amount of bandwidth due to the memory bus speed. Similarly, the GPU can access the main memory for computation in some cases. In this way, the various types of memory in a computer system can be viewed as a resource that is shared among the processors (e.g., CPU and GPU). In addition to the memory, other types of resources, such as power and thermal budget, can also be viewed as resources that are shared among the processors.

BRIEF DESCRIPTION OF THE DRAWINGS

A more detailed understanding can be had from the following description, given by way of example in conjunction with the accompanying drawings wherein.

DETAILED DESCRIPTION

Some implementations provide devices, methods and systems for managing resources in a computing device.

Information regarding memory bandwidth utilization is captured. A prediction is generated, based on the information, that a memory region stored in a first memory device will be addressed by a memory intensive instruction during an upcoming time period. Data stored in the memory region is moved to a second memory device, based on the prediction.

In some implementations, the method is implemented in a resource managing device. In some implementations, the resource managing device comprises an input output memory management unit (IOMMU), a processor in communication with an IOMMU, and/or a processor integrated with an IOMMU. In some implementations, the information indicates whether a previously executed instruction is a memory intensive instruction, whether a previously executed instruction is a designated instruction, and/or whether a previously executed instruction is a specific type of instruction. In some implementations, the prediction is generated by applying an autocorrelation function (ACF) and/or an artificial neural network (ANN) to the information In some implementations, the first memory device comprises relatively lower bandwidth memory and the second memory device comprises relatively higher bandwidth memory. In some implementations, the first memory device comprises synchronous dynamic random-access memory (SDRAM), double data rate (DDR) SDRAM, and/or low power double data rate (LPDDR) SDRAM. In some implementations, the second memory comprises high bandwidth memory (HBM) and/or cache memory.

Some implementations provide further devices, methods and systems for managing resources in a computing device. Information regarding resource usage is captured. A prediction is generated, based on the information, that resource usage by a processor will exceed a threshold during an upcoming time. An operating parameter of the processor is adjusted, based on the prediction.

In some implementations, the resource managing device comprises an input output memory management unit (IOMMU), a processor in communication with an IOMMU, and/or a processor integrated with an IOMMU. In some implementations, the resource comprises power and/or a thermal budget. In some implementations, the operating parameter comprises voltage, current, and/or a clock frequency. In some implementations, the operating parameter is adjusted with respect to a portion of the processor.

In some implementations, the information indicates whether resource usage by the processor exceeds the threshold during a previous time period. In some implementations, the prediction is generated by applying an autocorrelation function (ACF) and/or an artificial neural network (ANN) to the information.

Figure 1:
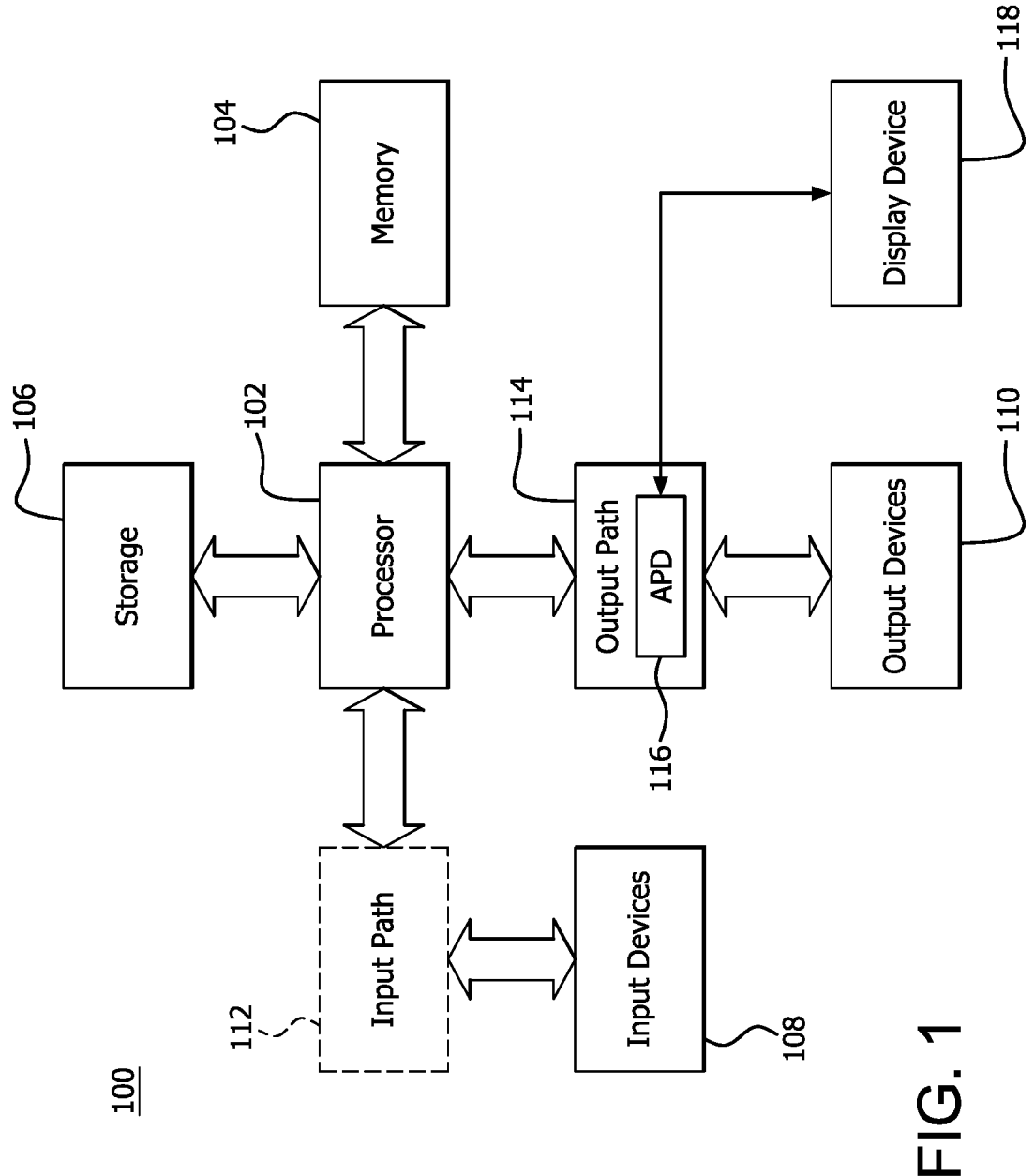
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also include an input path 112 and an output path 114. Aspects of the input and output paths may include, without limitation, circuitry and electrical connections within a die or between dies, as well as software components such as drivers. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input path 112 connects the processor 102 with the input devices 108, and permits the processor 102 to receive input from the input devices 108. The output path 114 communicates with the processor 102 and the output devices 110, and permits the processor 102 to send output to the output devices 110. The output path 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) nor provide graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm can also perform the functionality described herein.

Figure 2:
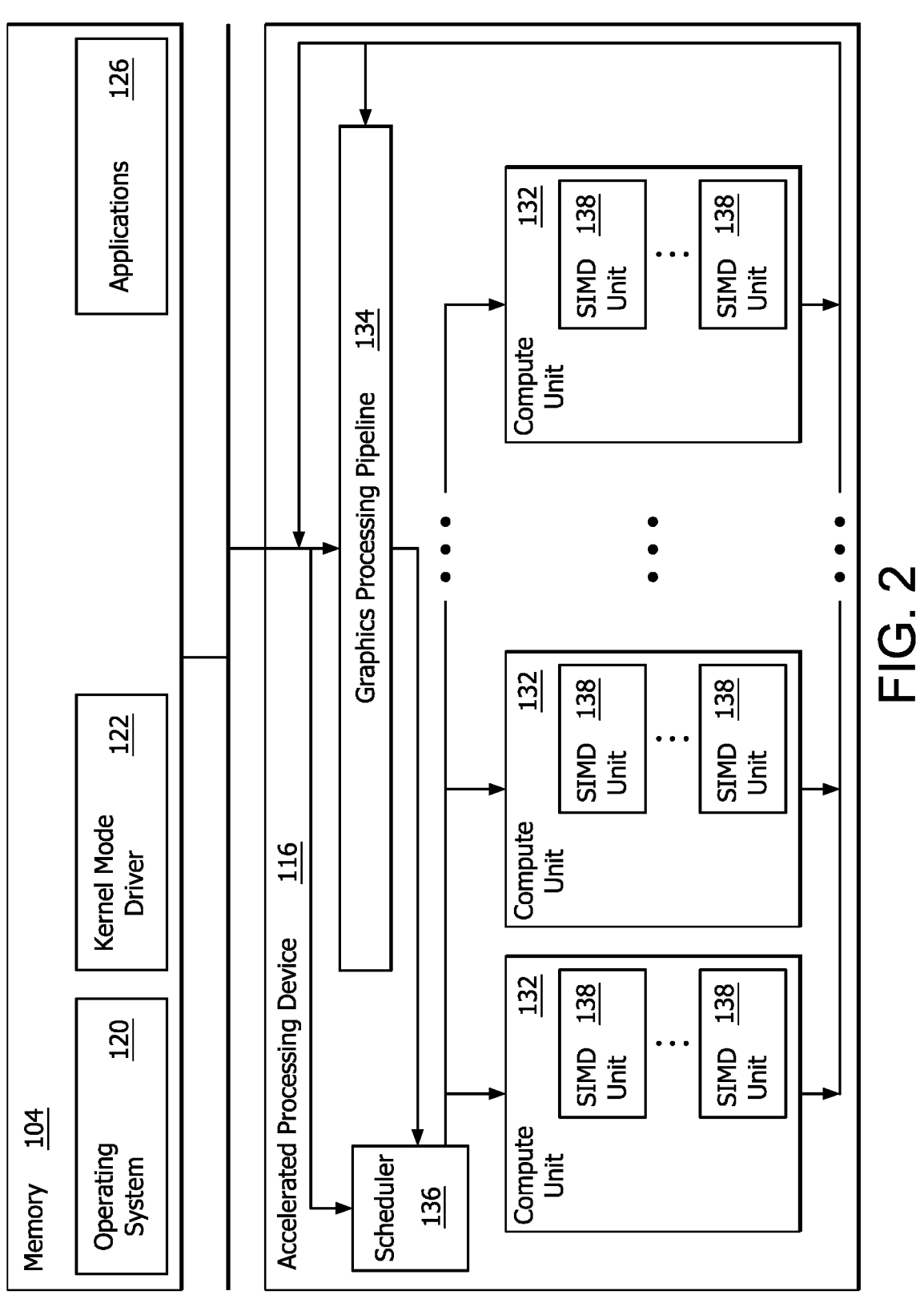
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 may also include a just-in-time compiler that compiles programs for execution by processing components (such as the SIMD units 138 discussed in further detail below) of the APD 116.

The APD 116 executes commands and programs for selected functions, such as graphics operations and non-graphics operations that are or can be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with or using different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
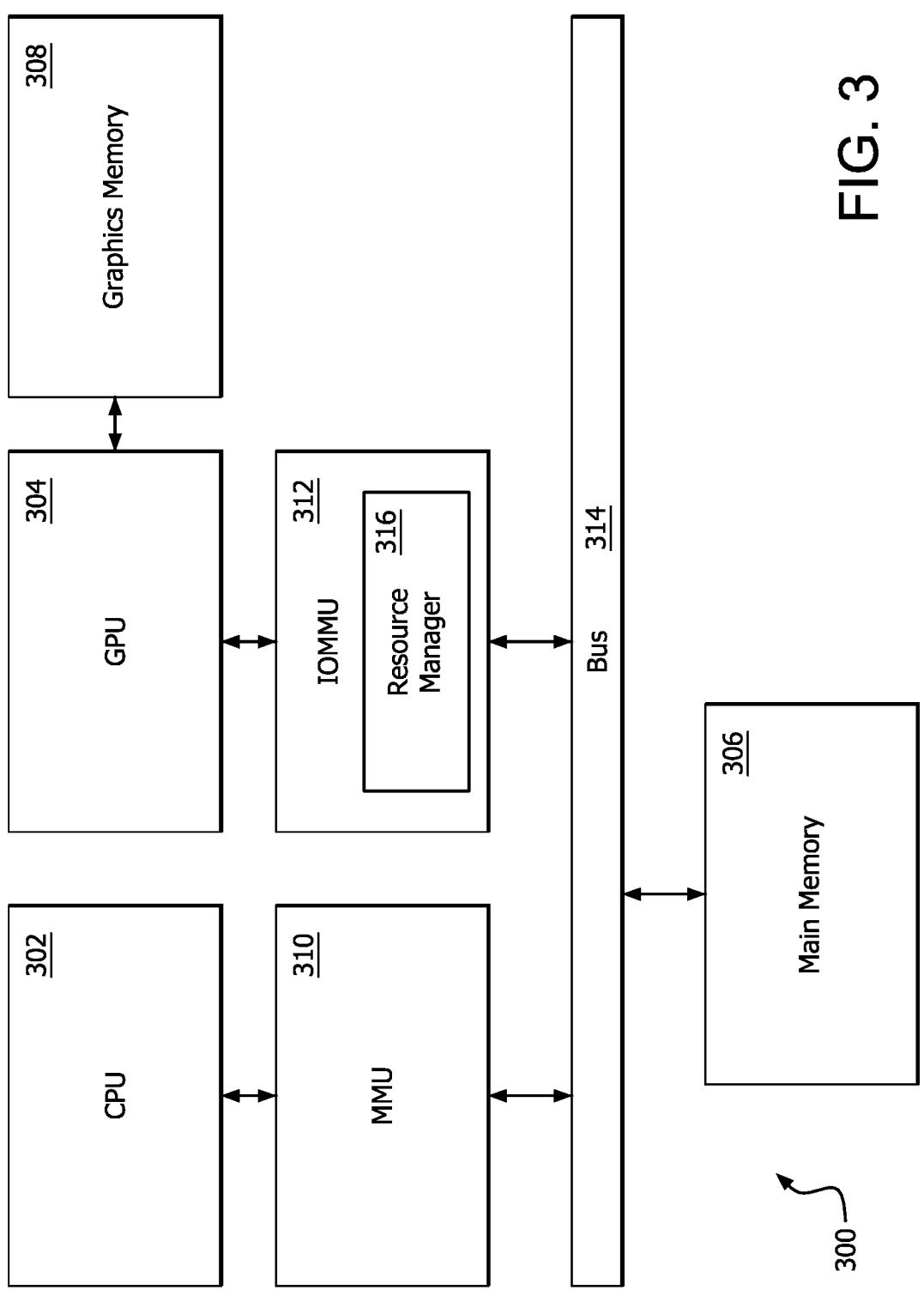
FIG. 3 is a block diagram illustrating an example device in which one or more features of the disclosure can be implemented.

FIG. 3 is a block diagram of an example device 300 in which one or more features of the disclosure can be implemented. The device 300 can include, for example, a computer, a gaming device, a handheld device, a set-top box, a television, a mobile phone, server, a tablet computer or other types of computing devices. In some implementations, device 300 is implemented using some or all of the aspects of device 100 shown and described with respect to FIG. 1.

The device 300 includes a CPU 302, GPU 304, main memory 306, graphics memory 308, memory management unit (MMU) 310, input/output memory management unit (IOMMU) 312, bus 314, and resource manager 316. In this example, resource manager 316 manages memory bandwidth.

CPU 302 includes any suitable processing device. In some implementations, CPU 302 is implemented using processor 102 as shown and described with respect to FIG. 1. GPU 304 includes any suitable graphics processing device. In some implementations, GPU 304 is implemented using APD 116 as shown and described with respect to FIG. 1.

Main memory 306 includes any suitable memory device. In some implementations, main memory 306 is implemented using memory 104 as shown and described with respect to FIG. 1. In this example, main memory 306 is implemented using LPDDR, or any other suitable memory which provides a relatively large amount of storage as compared with graphics memory, and a relatively low speed as compared with graphics memory.

Graphics memory 308 includes any suitable graphics memory device. In some implementations, graphics memory 308 is implemented using memory 104 as shown and described with respect to FIG. 1. In this example, main memory 306 is implemented using HBM, or any other suitable memory which provides a relatively high speed as compared with main memory, and a relatively small amount of storage as compared with main memory.

MMU 310 manages access to main memory 306. For example, requests from CPU 302, or from other devices, for reading from or for writing to main memory 306, are managed by MMU 310. IOMMU 312 manages access to GPU 304 and graphics memory 308. For example, requests from GPU 304 (or CPU 302, or from other devices, in some implementations) for reading from or writing to graphics memory 308, are managed by IOMMU 312. IOMMU 312 also manages a virtual address space (i.e., translates between virtual memory addresses and physical memory addresses) which covers CPU 302, GPU 304, (and in some implementations, other accelerator devices), main memory 306, and graphics memory 308. IOMMU 312 is positioned "in between" CPU 302 and GPU 304 (and in some implementations, other accelerator devices), although it is noted that more than a single accelerator may be connected to IOMMU 312. IOMMU 312 handles address transaction requests from the GPU 304 (or CPU 302, or other devices, in some implementations).

Bus 314 includes suitable communications infrastructure for communication among the components of device 300. In some implementations, bus 314 includes one or more of a Peripheral Component Interconnect (PCI) bus, PCI enhanced (PCIe) bus, Advanced Microcontroller Bus Architecture (AMBA) bus, Accelerated Graphics Port (AGP) bus, or other suitable communications infrastructure. CPU 302 communicates with main memory 306 over bus 314 via MMU 310, and communicates with GPU 304 over bus 314 via IOMMU 312. CPU 302 and GPU 304 both have access to main memory 306 and graphics memory 308 via bus 314.

CPU 302 executes various instructions which access data stored in memory. It is noted that different instructions require more memory bandwidth to execute than other instructions. For example, the following instruction families may pose heightened BW requirements: Streaming SIMD Extensions (SSE); Advanced Vector Extensions (AVX); AVX2; AVX-512; and AVX-512BW may result in varying bandwidth requirements. SSE is a single instruction, multiple data (SIMD) instruction set extension to the x86 architecture. AVX are extensions to the x86 instruction set architecture for microprocessors. AVX2 expands most integer commands to 256 bits and introduces fused multiply-accumulate (FMA) operations. AVX-512 expands AVX to 512-bit support using a EVEX prefix encoding. AVX extensions such as AVX-512BW, which mask vector accesses resulting in data-dependent access patterns across intervals and gather/scatter instructions such as VGATHERDPD/VSCATTERDPD. These are only examples of instructions which may occupy significantly more memory bandwidth during execution than other instructions (e.g., above a desired threshold more memory bandwidth). Such instructions are referred to herein as "bandwidth intensive" instructions.

Resource manager 316 is a processing element that manages memory bandwidth for requests issued by workloads from GPU 304 (or APD 304). In some implementations, resource manager 316 is an additional execution path of IOMMU 312 and may be implemented with a dedicated FPGA or ASIC processing element, or other suitable hardware. In some implementations resource manager 316 is a device that is alternatively or additionally in communication with MMU 310. In some implementations, aspects of the resource manager 316 may be implemented in operating system software.

Resource manager 316 determines data placement for CPU instructions. For example, in some implementations, resource manager 316 determines where to locate data corresponding to CPU instructions executing in an upcoming time interval (e.g., the next 1 minute). In some implementations, resource manager 316 takes as an input a time series profile of the number of accesses A from BW-intensive instructions to each of a plurality of physical regions of a particular size. This is described in more detail with respect to FIG. 4. In general, resource manager 316 determines a suitable type of memory for the data stored in a particular region of the shared address space to be stored in an upcoming time period in view of a prediction made based on the time series profile.

In the current example, system 300 includes main memory 306, which is implemented using LPDDR (low bandwidth memory) and includes graphics memory 308, which is implemented using HBM (high bandwidth memory). Accordingly, resource manager 316 determines whether data stored in a particular region of the shared address space should be stored in low bandwidth memory or high bandwidth memory in an upcoming time period, in view of a prediction of whether and/or how many bandwidth intensive instructions will access the region during the upcoming time period. Depending on the determination, resource manager 316 will move the data to a new physical memory location having suitable memory bandwidth capabilities, e.g., using operating system commands.

It is understood that device 300 can include additional components not shown in FIG. 3.

Figure 4:
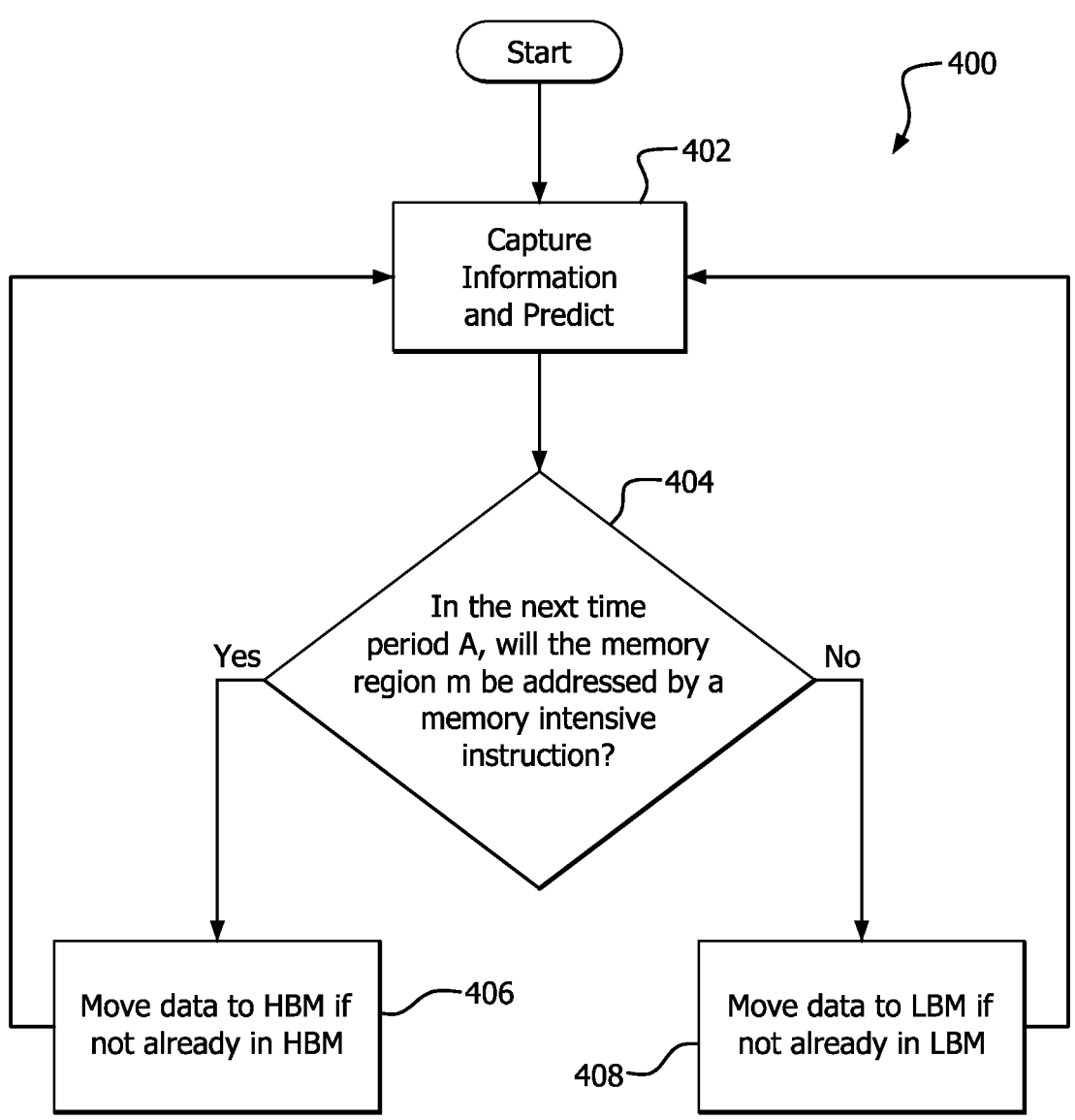
FIG. 4 is a flow chart illustrating an example method for managing memory bandwidth in a computing device, such as the computing device shown and described with respect to FIG. 3.

FIG. 4 is a flow chart illustrating an example method 400 for managing memory bandwidth in a computing device, such as device 300 as shown and described with respect to FIG. 3. In some implementations, method 400 is implemented by a resource manager, such as resource manager 316 as shown and described with respect to FIG. 3.

In step 402, the resource manager captures information on instructions accessing X sized regions of virtual memory in the system, over a time period (sample length) Y. For example, in some implementations, resource manager 316 captures information on instructions accessing 1 gigabyte (GB) regions of memory 306 and 308, over a time period of 1 minute (min). Here, the values X=1 GB, Y=1 min are exemplary; other values for X and Y are usable in other implementations, and/or these values are dynamically variable and/or user configurable.

In this example, for each memory region, the resource manager records whether and/or a number A of times the region is accessed by a bandwidth intensive instruction during the time period. The resource manager also records whether and/or a number A of times each region is accessed by a bandwidth intensive instruction during subsequent time periods, over a sample size of Z time periods, and thus accumulates a time series of data reflecting how often bandwidth intensive instructions access each memory region.

Based on the accumulated time series of information, the resource manager predicts, for each memory region, whether it is likely to be accessed by a bandwidth intensive instruction during the next (or a later) time period. The prediction is made in any suitable manner, such as by applying an autocorrelation function (ACF) or artificial neural network (ANN) to the time series data.

For each memory region, on condition 404 that it is predicted that an address in the memory region will be accessed by a bandwidth intensive instruction (or will be accessed by at least a threshold number of bandwidth intensive instructions), the resource manager moves the data in the virtual memory region to HBM (i.e., graphics memory 308 in this example), if it is not already in HBM. On condition 404 that it is predicted that an address in the memory region will not be accessed by a bandwidth intensive instruction (or will be accessed by fewer than a threshold number of bandwidth intensive instructions), the resource manager moves the data in the virtual memory region to LBM (i.e., main memory 306 in this example), if it is not already in LBM. These particular types of memory are exemplary only. It is noted that in some implementations, other kinds of memory are used, and more than two different types of memory may be differentiated by bandwidth intensiveness.

The resource manager moves the data in a virtual memory region from one physical memory to another physical memory in any suitable manner. For example, in some implementations, the resource manager calls an operating system (OS) to move the data. In some implementations, the resource manager invokes standard OS calls, such as Linux move_pages( ) or mbind( ) with MPOL_MF_MOVE flag to alter the mappings of virtual addresses to physical addresses to move the data transparently to applications executing on the system. In some implementations, this has the advantage of moving the data without needing to change the source code of the applications.

It is noted that while method 400 is described as implemented using a resource manager situated similarly to resource manager 316 as shown and described with respect to FIG. 3 (e.g., within or in communication with IOMMU

312), method 400 is implementable using any suitable hardware capable of tracking access to a plurality of memory regions (e.g., across a unified address space which covers heterogeneous memory types) by bandwidth intensive instructions.

Figure 5:
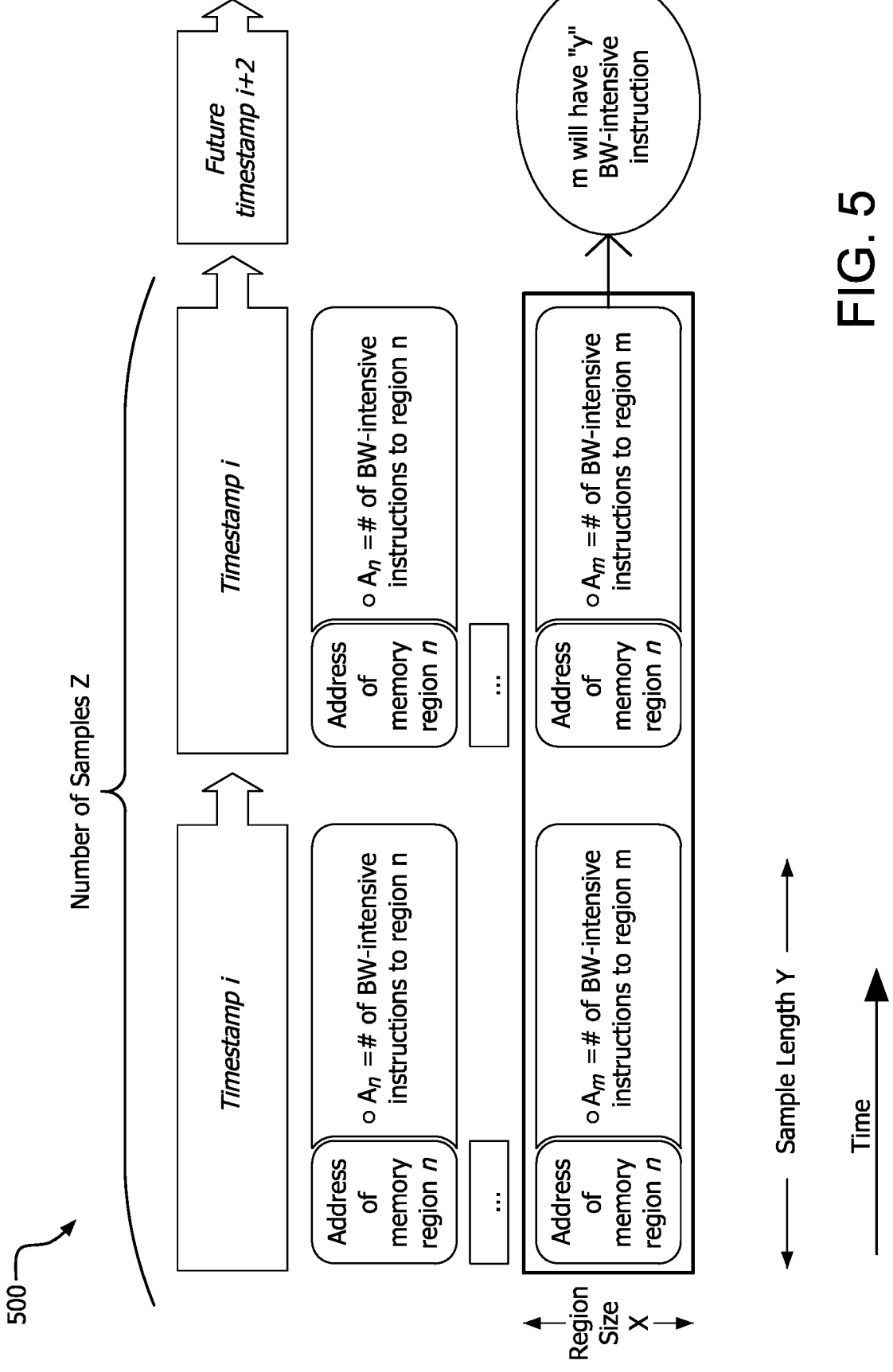
FIG. 5 is a block diagram illustrating an example method for predicting access to a region of memory by a bandwidth intensive instruction during a particular time period.

FIG. 5 is a block diagram illustrating an example method 500 for predicting whether and/or how many times a region of virtual memory is likely to be accessed by a bandwidth intensive instruction during a particular time period. The prediction is made in any suitable manner, such as using an autocorrelation function (ACF) or artificial neural network (ANN). In some implementations, method 500 is implemented in resource manager 316 or any other suitable hardware.

In this example, during time period i, which has a length Y, it is determined whether and/or how many times A an address within each of a plurality of memory regions (n, m in this example) is accessed by a bandwidth intensive instruction. This information is stored for use as input data to the prediction.

During subsequent time period i+1, which also has a length Y, it is again determined whether and/or how many times A an address within memory regions n,m is accessed by a bandwidth intensive instruction. This information is likewise stored for use as input data to the prediction.

After a suitable amount of historical data has been accumulated on bandwidth instruction access to the regions of memory (for a number of samples Z), a prediction is generated as to whether and/or how many times an address within each memory region will be accessed by a bandwidth intensive instruction. In the example shown, a prediction is made, based on the data collected during time periods i and i+1 (Z=2 in this example), that memory region m will be accessed by y bandwidth intensive instructions during time period i+2.

The prediction is made based on any suitable approach, such as by applying an ACF to the collected data, or by inputting the collected data to a suitably trained ANN. Based on the prediction, the resource manager may move data stored at the virtual addresses in region m to a different type of physical memory that is consistent with the expected y bandwidth intensive instructions during the upcoming time period.

It is noted that the different variables are user selectable and/or dynamically controllable. For example, region size X, sample length Y, and sample size Z are all adjustable, e.g., either by a user, or by a dynamic mechanism. In some implementations, dynamic control is advantageous if workload characteristics change at runtime. For example, a particular workload may require a smaller or larger sample length Y, or a smaller or larger sample size Z. In some implementations, such as where multi-programmed workloads are used, these variables are dynamically tuned, e.g., due to the OS adjusting resource allocation for each process at runtime. in some implementations, such dynamic mechanism inputs characteristics of the workload or workloads (e.g., bandwidth requirements or access granularity) and correlates these input variables with the output variables (X, Y, Z). In some implementations, the correlation is generated based on regression, or by another other correlating mechanism.

Figure 6:
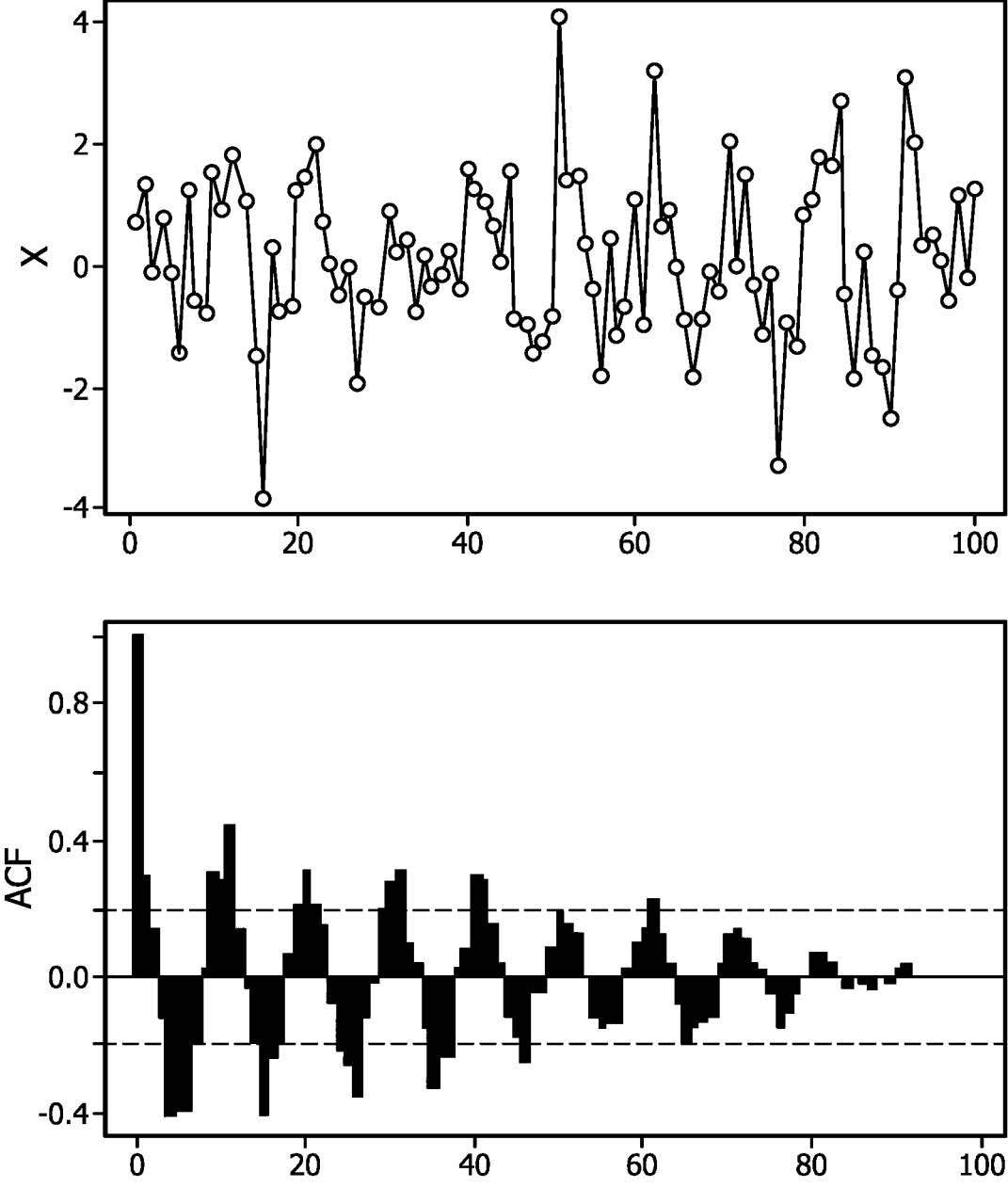
FIG. 6 shows line graphs which illustrate application of an autocorrelation function to predict access to a region of memory by a bandwidth intensive instruction during a particular time period.

FIG. 6 shows line graphs which illustrate application of an autocorrelation function to collected data to predict, based on the collected data, whether and/or how many bandwidth intensive instructions will access a memory region during an upcoming time period.

Autocorrelation is a method for time series analysis that measures the correlation of a signal with a delayed copy of itself as a function of delay, called lag. The analysis of autocorrelation is a mathematical tool for finding repeating patterns, such as the presence of a periodic signal obscured by noise. A plot of the autocorrelation of a time series by lag is called the Autocorrelation Function (ACF).

The upper graph is a plot of the Pearson's correlation coefficient for 100 samples of the number of times A that an address within a memory region is accessed by a bandwidth intensive instruction. The Pearson's correlation coefficient is a number between −1 and 1 that describes a negative or positive correlation respectively. A value of zero indicates no correlation. In this example, the series of 100 samples is concealing a sine function.

If data follows a trend, the autocorrelations for small lags tend to be large and positive because observations nearby in time are also nearby in size. Accordingly, the ACF of trended time series tend to have positive values that slowly decrease as the lags increase. If the data is periodic, the autocorrelation will be larger for seasonal lags (at multiples of the periodic frequency) than for other lags.

In this example, at each 1 min (Y) time interval, the CPU resource manager generates an ACF function for 100 values of A measured in the most recent 100 (Z) intervals for each 1 GB (X) memory region.

The lower graph is a plot of an ACF function the 100 values of A measured over 100 time intervals. In some implementations, the resource manager analyzes the ACF to predict the value of A in the next interval (i.e., the $101^{st}$ interval in this example, where Z=100).

An increase in the ACF as the lags decrease indicates a trend that is likely to continue. In terms of the example above, this is detected by the resource manager by measuring the delta (i.e., change) in between neighboring lags on the ACF.

If the delta is within a certain range (e.g., configurable via a memory mapped register of the resource manager, such as |0.1| on the ACF by default), a gradual change (and, hence, a trend) is detected. In this example, if the current value of A is low (e.g., low current BW from the issued CPU instructions, e.g., BW is below a threshold BW), the resource manager will move the region to LPDDR for the next interval (anticipating that the trend will continue). If the current A is high, the region will be moved to HBM. These memory types are only examples; the region is moved to (or kept in) any suitable memory type based on the prediction.

A "scalloped" or periodic shape of an ACF indicates seasonality. In some implementations, a scalloped or periodic shape is identified by identifying spikes (i.e., values above a threshold, which is configurable in some implementations) and measuring the interval between the spikes. If the interval is consistent for neighboring spikes (e.g., an interval of 4 between spikes 1 and 2, and also between spikes 2 and 3, and also between spikes 3 and 4, for example), a scalloped or periodic shape exists. In some implementations, the resource manager detects the periodic interval. Here, the interval is the distance between periodic spikes in the correlation. The spikes are detected based on a threshold (e.g., configurable via a memory mapped register of the resource manager, such as |0.5| on the ACF by default).

In some implementations, the resource manager will proactively move a region to a suitable memory (e.g., to LPDDR if the A is low (e.g., below a threshold A), and/or to HBM if the A is high (e.g., below a threshold A)) before the next spike occurs. These memory types are only examples; the region is moved to (or kept in) any suitable memory type based on the prediction.

It is noted that autocorrelation is only an example technique for predicting whether a region is likely to be accessed by a bandwidth intensive instruction during a particular time period. For example, in some implementations, the historical data is input to an ANN, which outputs a probability that the region is likely to be accessed by a bandwidth intensive instruction during a particular time period as an inference.

In some implementations, the techniques discussed herein are applicable to resources other than shared memory. For example, in some implementations, a resource manager manages power consumption in a computing device, or manages a thermal budget for the computing device, in a manner similar to the method 400 for managing memory bandwidth. In some implementations, any suitable resource (e.g., a resource shared by or affected by both CPU and GPU, or by more than one processor) is manageable by the resource manager.

Figure 7:
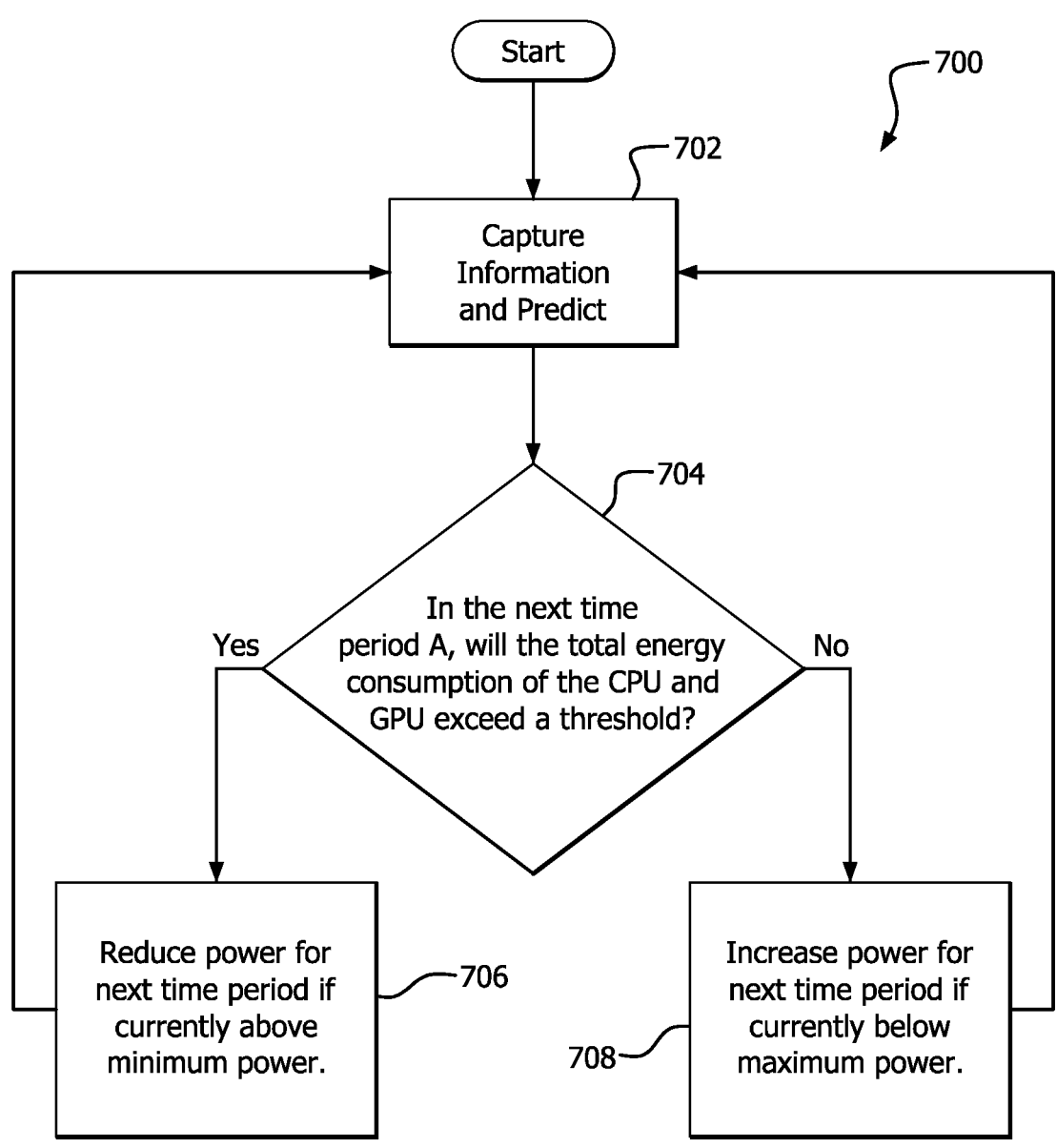
FIG. 7 is a flow chart illustrating an example method for managing energy consumption in a computing device, such as the computing device shown and described with respect to FIG. 3.

FIG. 7 is a flow chart illustrating an example method 700 for managing energy consumption in a computing device, such as device 300 as shown and described with respect to FIG. 3. In some implementations, method 700 is implemented by a resource manager, situated similarly to resource manager 316 as shown and described with respect to FIG. 3.

In step 702, the resource manager captures data regarding power consumption by CPU 302 and GPU 304, over a time period Y. For example, in some implementations, the resource manager, situated similarly to resource manager 316, captures power consumption by CPU 302 and GPU 304 over a time period of 1 minute (min). Here, the value Y=1 min is exemplary; other values for Y are usable in other implementations, and/or these values are dynamically variable and/or user configurable.

For each processor (e.g., CPU 302, GPU 304), the resource manager records power consumption (e.g., average, cumulative, etc.) during the time period. The resource manager also records power consumption for each processor during subsequent time periods, and thus accumulates a time series of data reflecting power consumption for each processor.

Based on the accumulated time series of data, the resource manager predicts, for each processor, the likely power consumption during the next (or a later) time period. The prediction is made in any suitable manner, such as using an autocorrelation function (ACF) or artificial neural network (ANN).

On condition 704 that it is predicted that the total power consumption of the processors will exceed a threshold, the resource manager reduces the power supplied to the system (e.g., decreases voltage) for the predicted time period in step 706, if the supplied power is currently above a minimum power.

On condition 704 that it is predicted that the total power consumption of the processors will not exceed the threshold, the resource manager increases the power supplied to the system (e.g., increases voltage) for the predicted time period in step 708, if the supplied power is currently below a maximum power.

These particular power interventions (i.e., e.g., power gating or scaling the entire system, CPU and/or GPU, individual cores or compute units of CPU and CPU, etc.) are exemplary only. It is noted that in some implementations, other kinds of interventions are used (e.g., increasing and decreasing clock frequency), and/or more than two different levels of frequency scaling and/or power gating/scaling may be used.

It is noted that while method 700 is described as implemented using a resource manager situated similarly to resource manager 316 as shown and described with respect to FIG. 3 (e.g., within or in communication with IOMMU 312), method 700 is implementable using any suitable hardware capable of tracking power for a plurality of processors.

Figure 8:
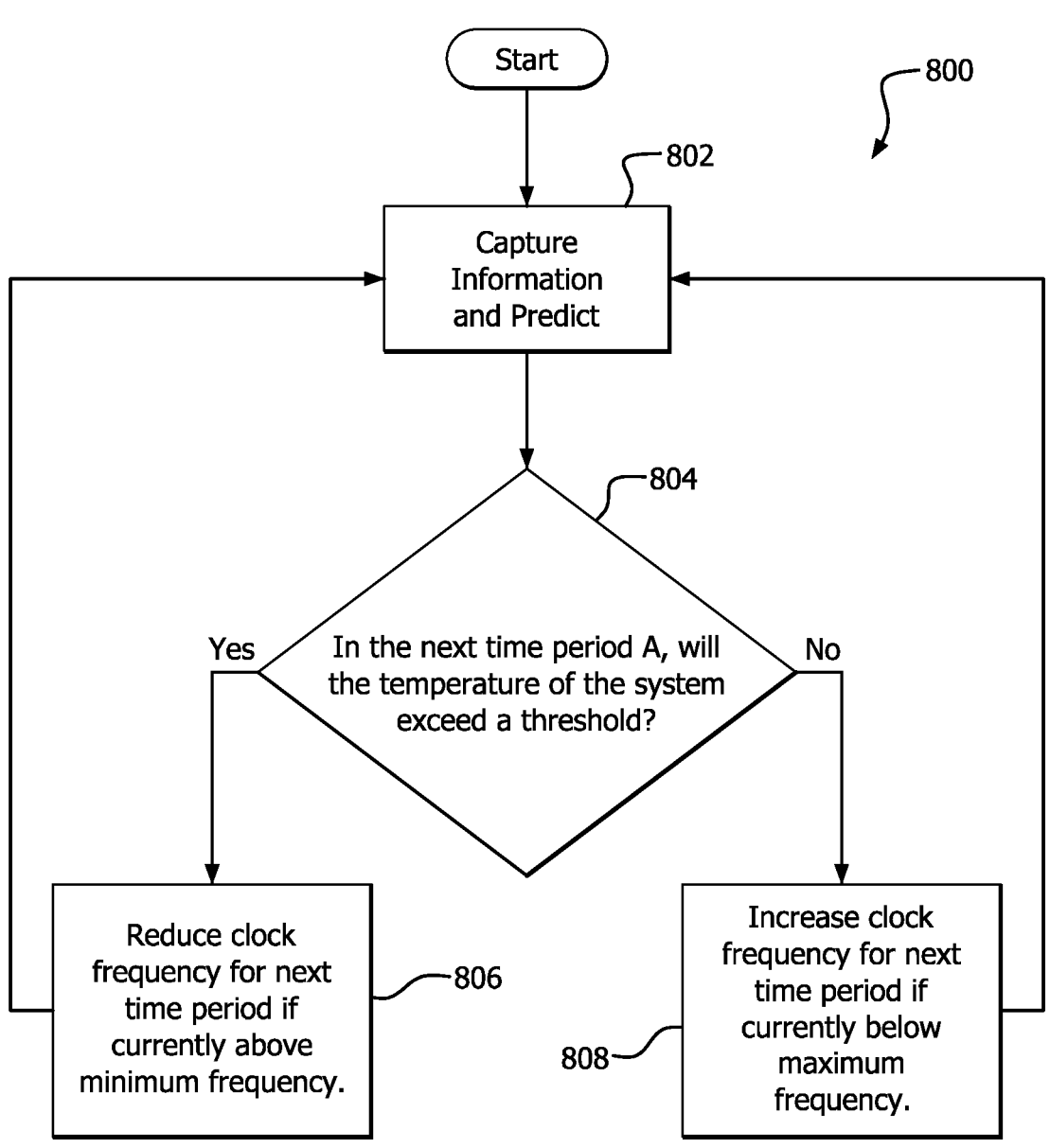
FIG. 8 is a flow chart illustrating an example method for managing temperature in a computing device, such as the computing device shown and described with respect to FIG. 3.

In another example, FIG. 8 is a flow chart illustrating an example method 800 for managing temperature in a computing device, such as device 300 as shown and described with respect to FIG. 3. In some implementations, method 800 is implemented by a resource manager, situated similarly to resource manager 316 as shown and described with respect to FIG. 3 (e.g., within or in communication with IOMMU 312).

In step 802, the resource manager captures data regarding temperature of CPU 302 and GPU 304, over a time period Y. For example, in some implementations, the resource manager, situated similarly to resource manager 316, captures the temperature of CPU 302 and GPU 304 over a time period of 1 minute (min). Here, the value Y=1 min is exemplary; other values for Y are usable in other implementations, and/or these values are dynamically variable and/or user configurable.

For each processor (e.g., CPU 302, GPU 304), the resource manager records temperature (e.g., average, cumulative, etc.) during the time period. The resource manager also records temperature for each processor during subsequent time periods, and thus accumulates a time series of data reflecting temperature for each processor.

Based on the accumulated time series of data, the resource manager predicts, for each processor, the likely temperature during the next (or a later) time period. The prediction is made in any suitable manner, such as using an autocorrelation function (ACF) or artificial neural network (ANN).

On condition 804 that it is predicted that the average temperature of the processors will exceed a threshold, the resource manager reduces the clock frequency of the system for the predicted time period in step 806, if it is currently above a minimum frequency.

On condition 804 that it is predicted that the average temperature of the processors will not exceed the threshold, the resource manager increases the clock frequency of the system for the predicted time period in step 808, if it is below a maximum frequency.

These particular thermal interventions (i.e., increasing and decreasing clock frequency) are exemplary only. It is noted that in some implementations, other kinds of interventions are used (e.g., power gating or scaling the entire system, CPU and/or GPU, individual cores or compute units of CPU and CPU, etc.), and/or more than two different levels of frequency scaling and/or power gating/scaling may be used.

It is noted that while method 800 is described as implemented using a resource manager situated similarly to resource manager 316 as shown and described with respect to FIG. 3 (e.g., within or in communication with IOMMU 312), method 800 is implementable using any suitable hardware capable of tracking temperature for a plurality of processors.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input path 112, the input devices 108, the output path 114, the output devices 110, the accelerated processing device 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A resource management device comprising:

circuitry configured to capture information regarding whether a previously executed instruction occupies more than a threshold memory bandwidth during execution; and circuitry configured to move data stored in a memory region in a relatively lower bandwidth first memory device to a relatively higher bandwidth second memory device, based on a prediction that an instruction by which the memory region will be addressed during an upcoming time period will be memory bandwidth intensive, wherein the prediction is based on applying an autocorrelation function (ACF) to the information regarding whether a previously executed instruction occupies more than a threshold memory bandwidth during execution.

2. The resource management device of claim 1, wherein the resource managing device comprises an input output memory management unit (IOMMU), a processor in communication with an IOMMU, and/or a processor integrated with an IOMMU.

3. The resource management device of claim 1, wherein the information indicates whether a previously executed instruction is a designated instruction.

4. The resource management device of claim 1, wherein the information indicates whether a previously executed instruction is a specific type of instruction.

5. The resource management device of claim 1, further comprising circuitry configured to generate the prediction by applying an artificial neural network (ANN) to the information.

6. The resource management device of claim 1, wherein the first memory device comprises synchronous dynamic random-access memory (SDRAM), double data rate (DDR) SDRAM, and/or low power double data rate (LPDDR) SDRAM.

7. The resource management device of claim 1, wherein the second memory device comprises high bandwidth memory (HBM) and/or cache memory.

8. A method implemented in a resource management device, the method comprising:

capturing information regarding whether a previously executed instruction occupies more than a threshold memory bandwidth during execution; and moving data stored in a memory region in a relatively lower bandwidth first memory device first memory device to a relatively higher bandwidth second memory device, based on a prediction that an instruction by which the memory region will be addressed during an upcoming time period will be memory bandwidth intensive, wherein the prediction is based on applying an autocorrelation function (ACF) to the information regarding whether a previously executed instruction occupies more than a threshold memory bandwidth during execution.

9. The method of claim 8, wherein the resource managing device comprises an input output memory management unit (IOMMU), a processor in communication with an IOMMU, and/or a processor integrated with an IOMMU.

10. The method of claim 8, wherein the information indicates whether a previously executed instruction is a designated instruction.

11. The method of claim 8, wherein the information indicates whether a previously executed instruction is a specific type of instruction.

12. The method of claim 8, wherein the prediction is generated by applying an artificial neural network (ANN) to the information.

13. The method of claim 8, wherein the first memory device comprises synchronous dynamic random-access memory (SDRAM), double data rate (DDR) SDRAM, and/or low power double data rate (LPDDR) SDRAM.

14. The method of claim 8, wherein the second memory device comprises high bandwidth memory (HBM) and/or cache memory.

* * * * *